(12) United States Patent
Dettinger et al.

(10) Patent No.: US 7,792,878 B2
(45) Date of Patent: Sep. 7, 2010

(54) FEE-BASED MODEL BASED ON DATABASE FEDERATION AND QUERY SUPPORT

(75) Inventors: Richard D. Dettinger, Rochester, MN (US); Richard J. Stevens, Rochester, MN (US)

(73) Assignee: International Business Machines Corporation, Armonk, NY (US)

(*) Notice: Subject to any disclaimer, the term of this patent is extended or adjusted under 35 U.S.C. 154(b) by 1464 days.

(21) Appl. No.: 10/901,594

(22) Filed: Jul. 29, 2004

(65) Prior Publication Data

US 2006/0026176 A1     Feb. 2, 2006

(51) Int. Cl.
*G06F 17/30* (2006.01)
*G06F 17/00* (2006.01)

(52) U.S. Cl. .................. 707/810; 705/400
(58) Field of Classification Search ......... 707/E17.032, 707/E17.114, E17.001, 769, 810, 999.102, 707/999.103, 999.01, 999.1; 705/26, 27, 705/37, 400; 709/201, 202, 203, 212, 217
See application file for complete search history.

(56) References Cited

U.S. PATENT DOCUMENTS

| | | | | |
|---|---|---|---|---|
| 5,596,744 A * | 1/1997 | Dao et al. | ...................... | 707/10 |
| 5,930,777 A * | 7/1999 | Barber | ........................ | 705/40 |
| 6,233,586 B1 * | 5/2001 | Chang et al. | ............ | 707/103 R |
| 6,330,552 B1 * | 12/2001 | Farrar et al. | .................. | 705/400 |
| 6,349,288 B1 * | 2/2002 | Barber | ........................ | 705/26 |
| 6,499,027 B1 * | 12/2002 | Weinberger | ..................... | 707/4 |
| 6,725,227 B1 | 4/2004 | Li | | |
| 6,987,987 B1 * | 1/2006 | Vacanti et al. | ............ | 455/556.2 |
| 7,249,060 B2 * | 7/2007 | Ling | ........................... | 705/26 |
| 2002/0059128 A1 * | 5/2002 | Pesch | .......................... | 705/37 |
| 2002/0073066 A1 * | 6/2002 | Coutts et al. | ................... | 707/1 |
| 2003/0110087 A1 * | 6/2003 | Rao et al. | ..................... | 705/26 |

OTHER PUBLICATIONS

Alonso et al., "Negotiating Data Access in Federated Database Systems", IEEE, Feb. 6-10, 1989, p. 56-65.*
Haas et al. IBM Federated Database Technology; the http://www.ibm.com/ print out; Mar. 2002; 11 pages.*
Sheth et al. Federated Database Systems for Managing Distributed, Heterogeneous, and Autonomous Databases; ACM Computing Surveys, vol. 22, No. 3, Sep. 1990; pp. 1-54.*

* cited by examiner

*Primary Examiner*—Igor Borissov
(74) *Attorney, Agent, or Firm*—Patterson & Sheridan, LLP

(57) ABSTRACT

A method, apparatus, and article of manufacture for calculating fees for accessing components of a federated database are disclosed. Generally, the federated database may be composed of database components exposed through an externalized data model by a first entity combined with database components from a second entity. The second entity defines a data model describing the structure of the database components made available to the first entity. Using the externalized data model from the second entity, the first entity may construct a composite data model defining the structure of the federated database. The second entity may further define a fee schedule describing how fees are to be calculated for accessing data from the database components described by the externalized data model.

6 Claims, 13 Drawing Sheets

FEE-BASED MODEL BASED ON DATABASE FEDERATION AND QUERY SUPPORT

BACKGROUND OF THE INVENTION

1. Field of the Invention

The present invention generally relates to a method for quantifying the value provided to an information consumer. More specifically, the present invention provides methods for an entity to calculate a competitive fee in information sharing transactions.

2. Description of the Related Art

Databases are computerized information storage and retrieval systems. A relational database management system is a database management system (DBMS) that uses relational techniques for storing and retrieving data. The most prevalent type of database is the relational database, a tabular database in which a relational schema defines how data is be reorganized, allowing the data to be accessed in a number of different ways.

Regardless of the architecture, using a DBMS, a requesting entity (e.g., an application, an operating system or a user) obtains access to a specified database by issuing an access request. Such requests may include, for instance, simple catalog lookup requests or transactions and combinations of transactions that operate to read, change and add specified records in the database. These requests are made using high-level query languages such as the Structured Query Language (SQL). The term "query" denominates a set of commands for retrieving data from a stored database. Queries take the form of a command language that lets programmers and programs select, insert, update, modify and retrieve data.

In environments where cooperating parties share access to multiple DBMSs, there is a need to properly charge each party with a competitive fee for the use of products or services. While there are currently several models for charging fees for the use of software products, there are significant problems with many of the current models given how software development and data storage has evolved over the past several years. The rapid growth of computer networks has created the opportunity for people to combine databases in previously unavailable ways. These new opportunities for collaboration have brought challenges, however, regarding to account for and apportion the fees charged to an entity that both contributes to, and receives a benefit from, databases and software applications.

In particular, many situations arise where one party may wish to combine its own data and resources with the data and resources of another party to accomplish a given task. For example, research studies frequently require a large volume of data to reach statistically significant conclusions. If the data is expensive or difficult come by, it may be both prohibitive and wasteful for a single party to acquire sufficient data to draw solid conclusions on its own. In this situation, it would be advantageous for a party to have access to data from one or more other parties, especially when the cost of recreating the data exceeds the cost of acquiring it from another party. This could occur either where all of the involved parties collaborate to the joint research project, or where private research is being conducted by a single party. From the other direction, one party may control a large amount of data and desire to allow others access to the data, and in some cases, provide data processing services that other parties may then combine with their own. In either case, there remains a need to fairly and competitively charge for the data and any associated services that are provided.

SUMMARY OF THE INVENTION

The present invention generally provides for fee based access to at least some components of a federated database. A federated database may be composed of database components exposed through an externalized data model by a first entity combined with database components from a second entity. One embodiment of the invention provides a method for accessing data. The method generally includes defining a composite data model, wherein the composite data model describes a federated database composed from database components provided by a first entity and at least one component provided by a seconded entity described in an externalized data model, and composing a query to retrieve data from the federated database defined by the composite data model. The method generally further includes providing the query to a runtime component configured to execute the composite query against the federated database, and determining a fee amount charged to the first entity for at least one element of data included in the query results originating from the database component provided by the second entity.

Another embodiment of the invention provides a method of calculating the fees charged to a requesting entity for accessing data. The method generally includes defining at least an externalized data model that describes an underlying set of database components used to construct a composite data model that describes a federated database, wherein the federated database comprises database components taken from the externalized data model and at least one database component controlled by the requesting entity, and receiving, from the requesting entity, a query fragment consistent with the externalized data model. The method generally further includes executing the query fragment against the underlying set of database components; and determining a fee amount charged to the requesting entity for executing the query fragment.

Another embodiment of the invention provides a system for providing access to data. The system generally includes a federated database, wherein the federated database integrates database components taken from a set of databases controlled by a first entity that are described by an externalized data model and taken from at least one database component provided by a second entity, and a fee schedule describing fee calculations charged to the second entity for accessing data from the set of database components controlled by the first entity that are included in the federated database. The system generally further includes a runtime component configured to process a query consentient with the federated database, and a transaction manager configured to monitor query active to determine fee amounts for executing queries that retrieve data from the set of database controlled by the first entity.

Another embodiment of the invention provides a computer readable medium containing a program which, when executed, performs an operation. The operation generally comprises defining at least an externalized data model that describes an underlying set of database components used to construct a composite data model that describes a federated database, wherein the federated database comprises database components taken from the externalized data model and at least one database component controlled by the requesting entity. The operations generally further include, receiving, from a requesting entity, a query fragment consistent with the externalized data model, executing the query fragment against the set of data repositories, determining a fee amount for executing the query fragment, providing the requesting entity with an indication of the fee amount accessing data corresponding to a query fragment; and returning to data accessed by the query fragment to the requesting entity.

BRIEF DESCRIPTION OF THE DRAWINGS

So that the manner in which the above recited features, advantages and objects of the present invention are attained and can be understood in detail, a more particular description of the invention, briefly summarized above, may be had by reference to the embodiments thereof which are illustrated in the appended drawings.

Note, however, that the appended drawings illustrate only typical embodiments of this invention and are therefore not to be considered limiting of its scope, for the invention may admit to other equally effective embodiments.

DETAILED DESCRIPTION OF THE PREFERRED EMBODIMENTS

Figure 1:
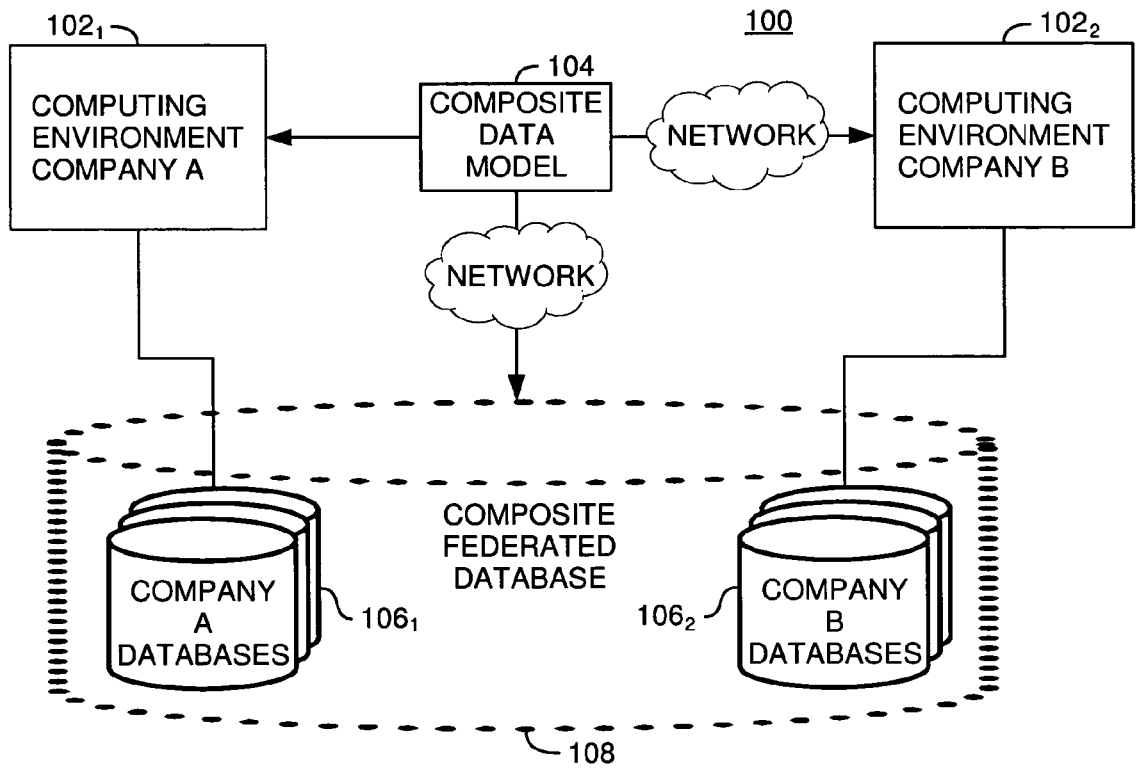
FIG. 1 is an illustrative view of a multiple computing environments, according to one embodiment of the invention.

The present invention is generally directed to a method for calculating the fees charged to different entities for accessing data in a database using a query application. Generally, a first entity that controls a set of databases externalizes a data model describing what data is stored in the databases and a structure of the externalized data (i.e., a database schema). The externalized data model may also indicate how fees will be assessed for accessing data according to the data model. A second entity that controls its own set of databases may construct a composite data model defining a database schema referencing both sets of databases (i.e., the first entities' set of databases and its own set). The combined data collection is commonly referred to as a federated database. Using the composite data model, the second entity may query the federated database as though it were a single construct and retrieve data from both the databases it controls as well as from the databases controlled by the first entity. A transaction manager may be used to monitor accesses made of the externalized data and charge an appropriate fee.

A federated database environment provides site transparent access to multiple component databases. A federated database is built from a combination of autonomous, heterogeneous databases that may be located across system to system, department to department, or enterprise to enterprise boundaries. Each of the database components may be accessed independently from the federated system. For example, individuals at a research institution may have access to a collection of local database components, while at the same time, some of the components are included as part of the externalized data model. A second group of researchers at another institution may access data through a composite data model. Embodiments of the present invention allow the first group to charge fees for access to data made by the second group of researchers from the federated components that is freely available to the first group of researches.

The fee charged may be based on any fee structure agreed upon by the entities involved. For example, under a query based fee structure, if the second entity provided the data that made up 90% of the results of a particular query, then the fee would typically be less then if the first entity provided a majority of the data used to generate the query results. Another fee structure could be based on the relative expense of recreating data obtained from the first entity. For example, if the first entity stored data related to tests conducted on tissue samples for a large population of patients, it would be difficult, if not impossible, for the second entity to recreate this data. Accordingly, the first entity may charge a premium proportional to the cost of data recreation. Yet another fee structure might contemplate charging for the use of a query processing application combined with the externalized data model to perform complex functions on data retrieved, or the relative value of the data could be weighted to determine a fee structure, e.g., gene expression data being more valuable than gender information in most contexts.

As used herein, reference is made to entities, companies and parties, it being understood that an each of these may be any type of profit or non-profit business entity, governmental agency or institution, university or college. Further, although some examples described herein relate to medical data obtained by hospitals and research institutions, the medical nature of this data used in these examples is meant to be illustrative and is used only to facilitate the description of components and methods of the present invention. Accordingly, these examples do not exclude embodiments of the present invention implemented to process non-medical data or otherwise limit the present invention.

Further, in the following, reference is made to embodiments of the invention. The invention is not, however, limited to specific described embodiments. Instead, any combination of the following features and elements, whether related to different embodiments or not, is contemplated to implement and practice the invention. Furthermore, in various embodiments the invention provides numerous advantages over the prior art. Although embodiments of the invention may achieve advantages over other possible solutions or over the prior art, whether or not a particular advantage is achieved by a given embodiment is not limiting of the invention. Thus, the following aspects, features, embodiments and advantages are merely illustrative and are not considered elements or limitations of the appended claims except where explicitly recited in the claims. Similarly, reference to "the invention" shall not be construed as a generalization of any inventive subject matter disclosed herein and shall not be considered to be an element or limitation of the appended claims, except where explicitly recited in a specific claim.

One embodiment of the invention is implemented as a program product for use with a computer system, the program products define functions of the embodiments (including the methods described herein) and can be contained on a variety of signal-bearing media. Illustrative signal-bearing media include, but are not limited to: (i) information permanently stored on non-writable storage media (e.g., read-only memory devices within a computer such as CD-ROM disks readable by a CD-ROM drive); (ii) alterable information stored on writable storage media (e.g., floppy disks within a diskette drive or hard-disk drive); and (iii) information conveyed to a computer by a communications medium, such as through a computer or telephone network, including wireless communications. The latter embodiment specifically includes information downloaded from the Internet and other networks. Such signal-bearing media, when carrying computer-readable instructions that carry out functions of the present invention represent embodiments of the present invention.

Embodiments of the present invention may be implemented to run using any form of modern general-purpose computer system. Accordingly, the methods described below may be carried out by software configured to run on systems ranging from single-user workstations, client-server networks, large distributed systems employing peer-to-peer techniques, or parallel processing systems wherein multiple CPU's are connected via high-speed networks to function together as a single processing environment.

In general, the routines executed to implement the embodiments of the invention, may be part of an operating system or a specific application, component, program, module, object, or sequence of instructions. The computer program of the present invention typically is comprised of a multitude of instructions that will be translated by the native computer into a machine-readable format and hence executable instructions. Also, programs are comprised of variables and data structures that either reside locally to the program or are found in memory or on storage devices. In addition, various programs described hereinafter may be identified based upon the application for which they are implemented in a specific embodiment of the invention. However, it should be appreciated that any particular program nomenclature that follows is used merely for convenience, and thus the invention should not be limited to use solely in any specific application identified and/or implied by such nomenclature.

FIG. 1 illustrates a computing environment 100 in which embodiments of the present invention may be implemented. As illustrated, company A maintains a computing environment $102_1$. Within this environment, agents of company A access data from databases $106_1$. Similarly, company B maintains its own computing environment $102_2$ with its own set of databases and data $106_2$ accessed by agents of company B. Computing environments 102 may comprise any number of computer workstations, servers, and software applications running thereon connected together to form a computer network. Additionally, computing environments 102 may be connected to a larger network. In one embodiment, computing environments 102 may be connected over the Internet.

In one embodiment, a composite data model 104 defines the structure of a composite federated database 108. Federated database 108 is a virtual database (as illustrated by the dashed lines in FIG. 1) composed from a set of underlying physical databases, with some components from company A and some from company B. As used herein, a data model may be used to describe an underlying physical structure and location of stored data. For example, in a relational database, data is stored in tables, within a table, information is stored in homogeneous columns, (e.g., a column named registration date would contain information only of type date.) A data model (or "schema") corresponding to a relational database describes the tables, and data stored within the tables, that may be the subject of a database query. In one embodiment, the composite data model includes an SQL schema joining database components from both company A and company B. Federated database 108 is defined by such a composite schema.

Figure 2:
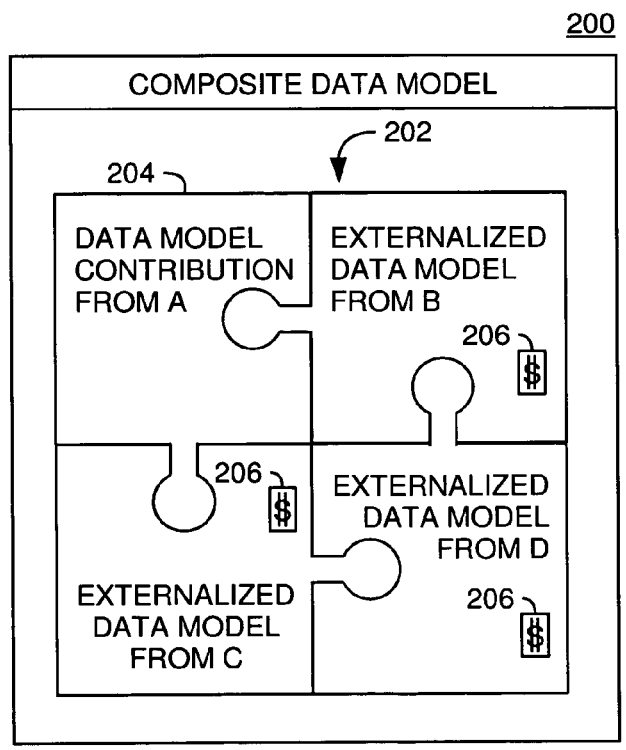
FIG. 2 is an illustrative view of a composite data model composed from a plurality of data models, according to one embodiment of the invention.

FIG. 2 illustrates a composite data model 200 comprised of four data model contributions 202. Together, the four data model contributions merge to form the composite data model 200. Each data model contribution 202 may refer to a different set of underlying physical data repositories maintained by different entities. As illustrated, the composite data model includes a data model contribution 204 from company A that represents a mapping to data stored in databases controlled by company A (e.g., databases $106_1$) and includes three externalized data models supplied by other entities (e.g., externalized data model 204 describing the structure and data stored in databases $106_2$ controlled by company B). Company B may define the externalized data model 206 to expose some of the data stored in databases $106_2$. Company A may incorporate the externalized data model 206 into the composite data model 200. In addition, each externalized data model contribution 202 may include a fee schedule 206 indicating how fees will be incurred for outside parties to access data from the underlying database components externalized by the externalized data model.

Figure 3:
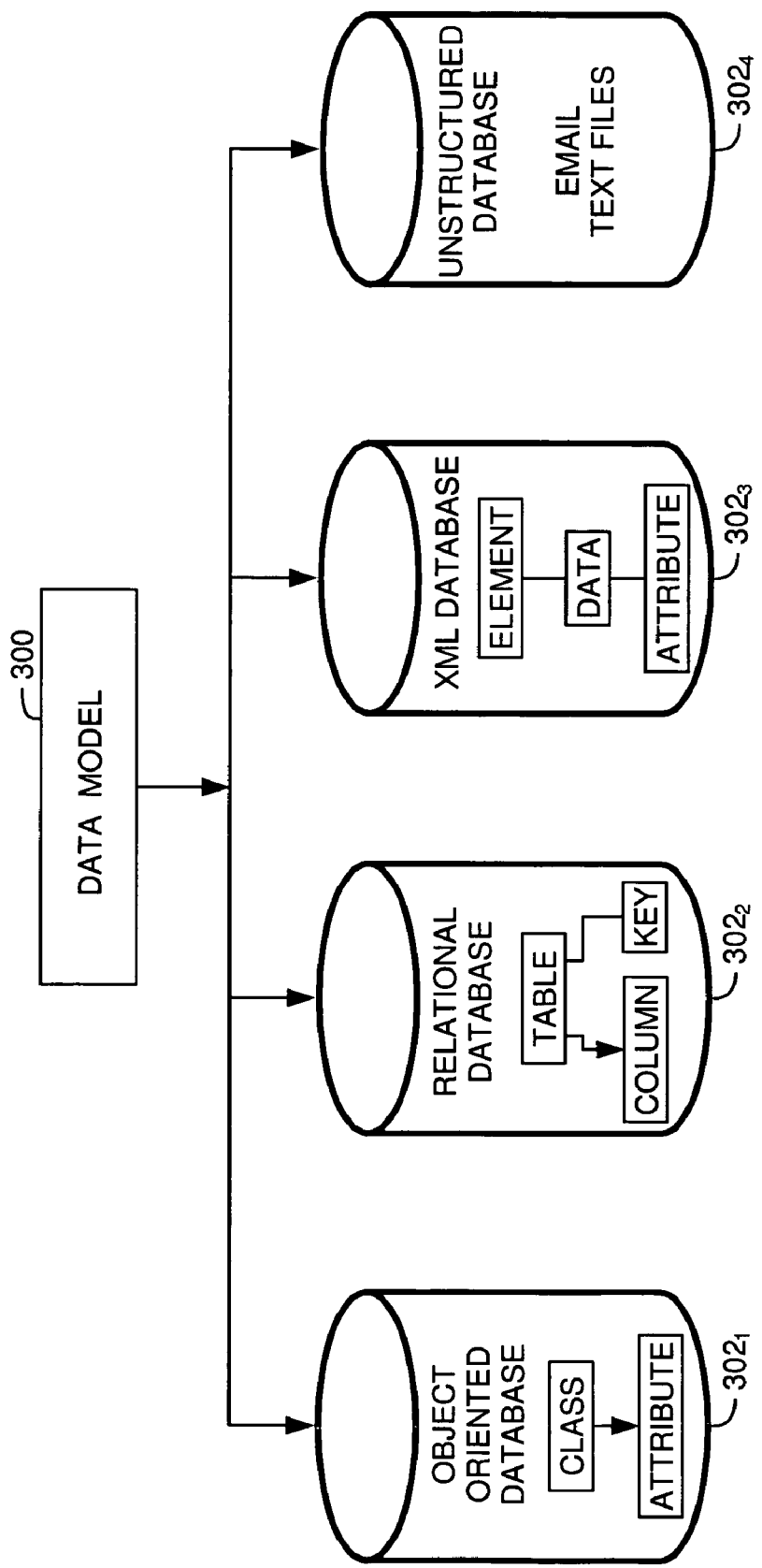
FIG. 3 is an illustrative view of a data model describing the structure of multiple underlying physical data repositories.

FIG. 3 further illustrates the relationship between a data model 300 and the underlying structure of multiple heterogeneous physical databases 302. Database $302_1$ comprises an object-oriented database wherein data is described as an objects and operations on the objects stored by the database. Database $302_2$ comprises a relational database composed from tables, columns, and keys. Database $302_3$ illustrates an XML database storing data in a hierarchy of elements, children, and attributes about both. Finally, database $304_4$ illustrates other kinds of data sources, including unstructured data that may be stored by one party and accessed according to data model 300. For example, a set of documents may be made part of the externalized data model and searched using free text queries. Thus, a data model 300 may be used to describe any underlying set of data, regardless of the physical mechanisms used to represent the data. In one embodiment, a data model 300 comprises an abstract data model configured to process an abstract query. Abstract data models and abstract queries are described in greater detail below.

Figure 4A:
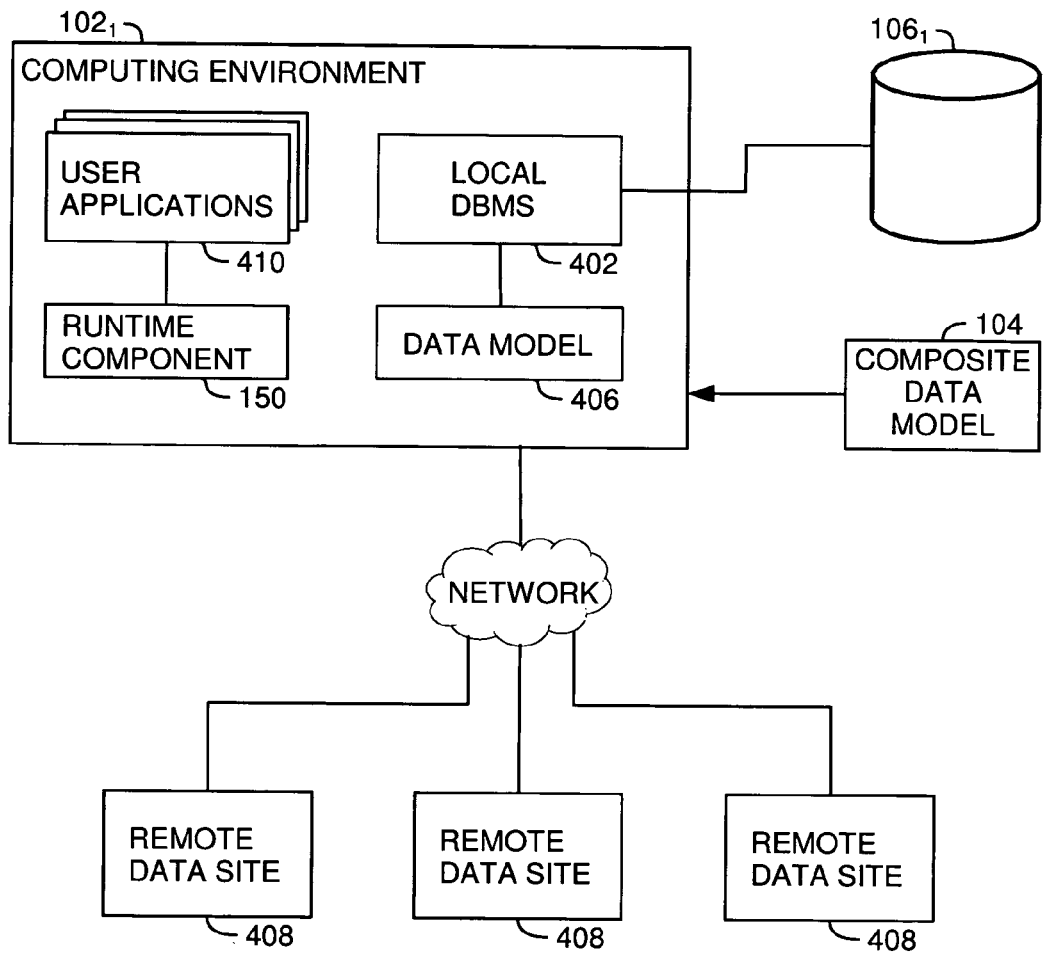
FIG. 4A is an illustrative view of computing environment allowing users to obtain data from a local data source and a plurality of remote data sources.

FIG. 4A illustrates a computing environment $102_1$ maintained by a first entity configured to access data from local databases $106_1$ and data from remote data sites 408, as a federated database, according to the composite data model 104. The computing environment $102_1$ includes a local DBMS 402, with a database structure defined according to a local data model 406. User applications 410 may be configured to compose queries posed to either the local DBMS 402 or to the larger federated database. A runtime component 150 may be configured to validate, parse, and execute queries issued to the local DBMS 402 and also to the federated database that includes components from the local DBMS 402. The remote data site 408, may itself comprise a computing environment similar to the one illustrated by computing environment $102_1$. Thus, whether the database $106_1$ is "local," "federated," or "remote" may be context specific and depend largely on the computing environment that the query being processed originated from. That is, database $106_1$ acts as a "local" database when accessed by users interacting with user applications 410 within the computing environment $102_1$ and as a "remote" database when some of its components are exposed through an externalized data model. Each remote data site 408 may include one or more physical databases that are accessed using the composite data model 104.

Figure 4B:
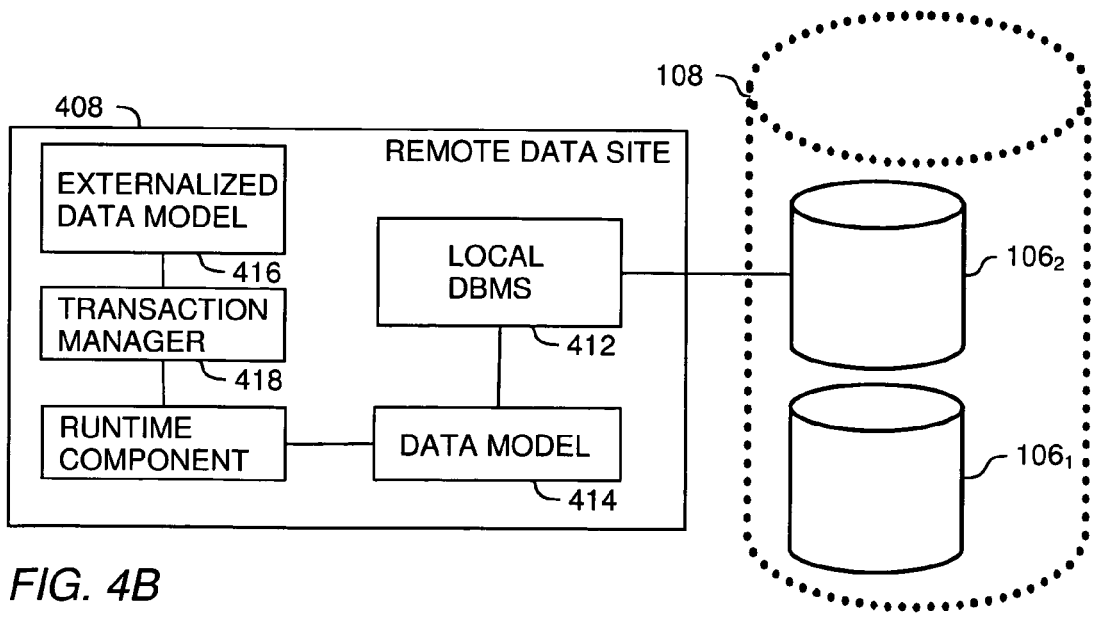
FIG. 4B is illustrative view of a remote data site, according to one embodiment of the invention.

FIG. 4B illustrates a view of an embodiment of a remote data site 408. Similar to the computing environment $102_1$, the remote data site 408 may include its own local database $106_2$, local DBMS 412, and data model 414. Additionally, remote data site 408 may include a runtime component 150 configured to process queries from local users and queries received from users of a federated database 108. The federated database includes components $106_1$ from computing environment $102_1$. In one embodiment, the externalized data model 416 defines the interface exposing components of the local DBMS 412 to remote users. In one embodiment, the remote data site includes a transaction manager 414 that is configured to manage fees associated with remote query requests. The transaction manager may be used to authenticate the identity of remote users and verify that users are authorized to access data associated with a particular query.

The transaction manager 414 may be further configured to maintain fee accounts corresponding to different users. As queries from remote users are received, the transaction manger 414 may monitor activity that occurs in response and record the appropriate fee amounts.

Figure 5:
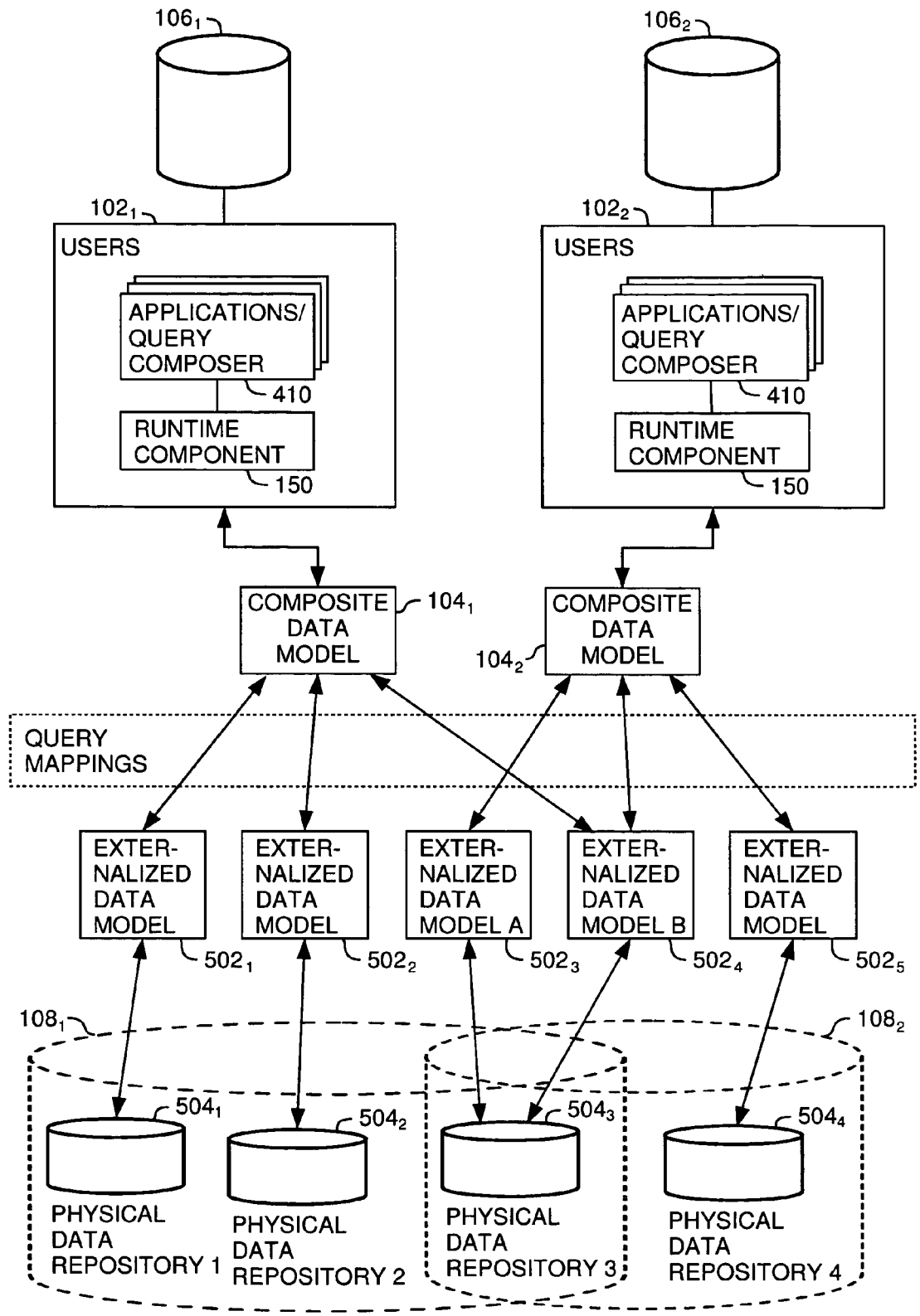
FIG. 5 is an illustrative view connecting discrete computing environments to a federated database using a composite data model, according to one embodiment of the invention.

FIG. 5 illustrates the relationships between users in different computing environments 102 that interact with federated databases 108 through composite data models 104. Illustratively, FIG. 5 shows two computing environments 102. In these environments, a user from one entity (e.g. users from environments $102_1$ or $102_2$) may compose a composite query with query application 410. A composite query references a federated database 108 as though it were a single unified entity. As illustrated, federated databases $108_1$ and $108_2$ (represented by the overlapping dashed lines) correspond to the federated database for computing environments $102_1$ and $102_2$, respectively. Thus, the same database components may be included in more than one federated schema. Also, note that components from one physical data repository (e.g., data repository $504_2$) may be externalized into multiple data models (e.g., externalized data models $502_3$ and $502_4$).

In one embodiment, once a composite query is provided to the runtime component 150, it may be decomposed into a set of query fragments. The individual query fragments may map to different externalized data models or to the local database $106_1$. For example, a composite query from a user in computing environment $102_1$ may be broken up into a query fragment to retrieve data from the local database $106_1$, and into query fragments to retrieve data according to externalized data models $502_1$, $502_2$, and $502_3$. Similarly, users in computing environment $102_2$ access a different federated database through their own composite data model $104_2$. In addition to the local database $106_2$, the composite data model $104_2$ includes data from externalized data models $502_3$, $502_4$, and $502_4$.

In one embodiment, a composite query may be defined using SQL. In such an embodiment, the composite data model 104 may define an SQL schema for the federated database 108. In another embodiment, composite queries may be abstract queries, and the composite data model may be defined using a data abstraction model. An abstract query is composed using a set of logical fields defined by the data abstraction model. Each logical field is mapped to one or more physical entities of data of an underlying data representation being used in the database 108 (e.g., XML, SQL, or other type representation) using an access method. In the data abstraction model logical fields may be defined independently from the underlying data representation, thereby allowing queries to be formed that are loosely coupled to the underlying data representation. An abstract query may be used to access the data and return query results, or to modify (i.e., insert, delete or update) the data from the underlying physical data storage mechanism. The abstract query is transformed into a form for execution against the federated database 108 that is consistent with the underlying physical data repository 504.

Whether a query is composed of SQL statements, logical fields of an abstract query, or by another defined query language and schema, the queries issued by the applications 410 are defined according to the composite data model 104. Such queries may be predefined (i.e., hard coded as part of the applications 410) or may be generated in response to input (e.g., user input). In one embodiment, abstract queries are composed using logical fields that may be defined by a composite data model 104. In particular, the logical fields used in the abstract queries are defined by a data repository abstraction component 148 of the composite data model 104. Thus, one can envision an interconnected web of databases underneath an abstract query. For example, although one composite data model 104 may transmit a query fragment to a remote data site, once received the remote data 408 site might process the query fragment by referring the query to another remote data site, and so on until the logical field of the query is transformed into a final physical location and concrete form used to query a data repository mechanism.

Abstract queries are executed by a runtime component 150 which transforms an abstract query into a form consistent with the physical representation of the data contained in one or more of the databases 504. In one embodiment, the computing environment $102_1$ includes a runtime component 150 that processes a query into a set of query fragments. In addition, as the composite query is broken into query fragments, each one may be transmitted to a runtime component 150 running on a remote data site 408 that processes the query fragment.

Alternatively, the runtime component 150 present in the local computing environment 102 may be configured to fully process the query by translating it from the abstract query of the composite data model 104 into a collection of query fragments that it then uses to query the local databases and externalized data models. Each query fragment corresponding to an externalized data model 502 may then be used to generate a concrete query, i.e., a query consistent with the underlying physical data repository 504. Regardless of how a particular embodiment translates queries into a form consistent with the underlying physical data repository 504, query activity is monitored and fees are accrued depending on what data, and what databases are accessed from the remote data sites. In one embodiment, query activity is monitored by a transaction manager 408 running at each remote data site 502. As query fragments are received and processed, fees accrue according to a fee structure defined by the externalized data model 416. In another embodiment, an entity that wishes to externalize data through an externalized data model may provide the query application 410 used by users in a computing environment 102. In such a case, the provided query application 410 may monitor access requests that include data from the externalized data model.

In one embodiment, elements of a query are specified by a user through a graphical user interface (GUI). The content of the GUIs may be generated by the applications 410. In a particular embodiment, GUI content is specified by hypertext markup language (HTML) content which may be rendered on a computer running a web-browser application. Accordingly, query results returned from remote data sites may be merged and displayed using HTML files generated by the runtime component 150, and supplied to a HTTP server application (e.g., apache, Microsoft's IIS® product, or IBM's web-Sphere® product) that transmits the results to a user Additionally, in one embodiment, queries may be composed using a web-based interface.

In an embodiment where remote databases 504 are accessed via the application 410 using a data abstraction model, the logical field definitions in a composite data model 104 (and data repository abstraction component 548) may be configured with a location specification identifying the remote data site of the database containing the data to be retrieved. FIGS. 6-10 further describe data models using an abstract data model.

Figure 6A:
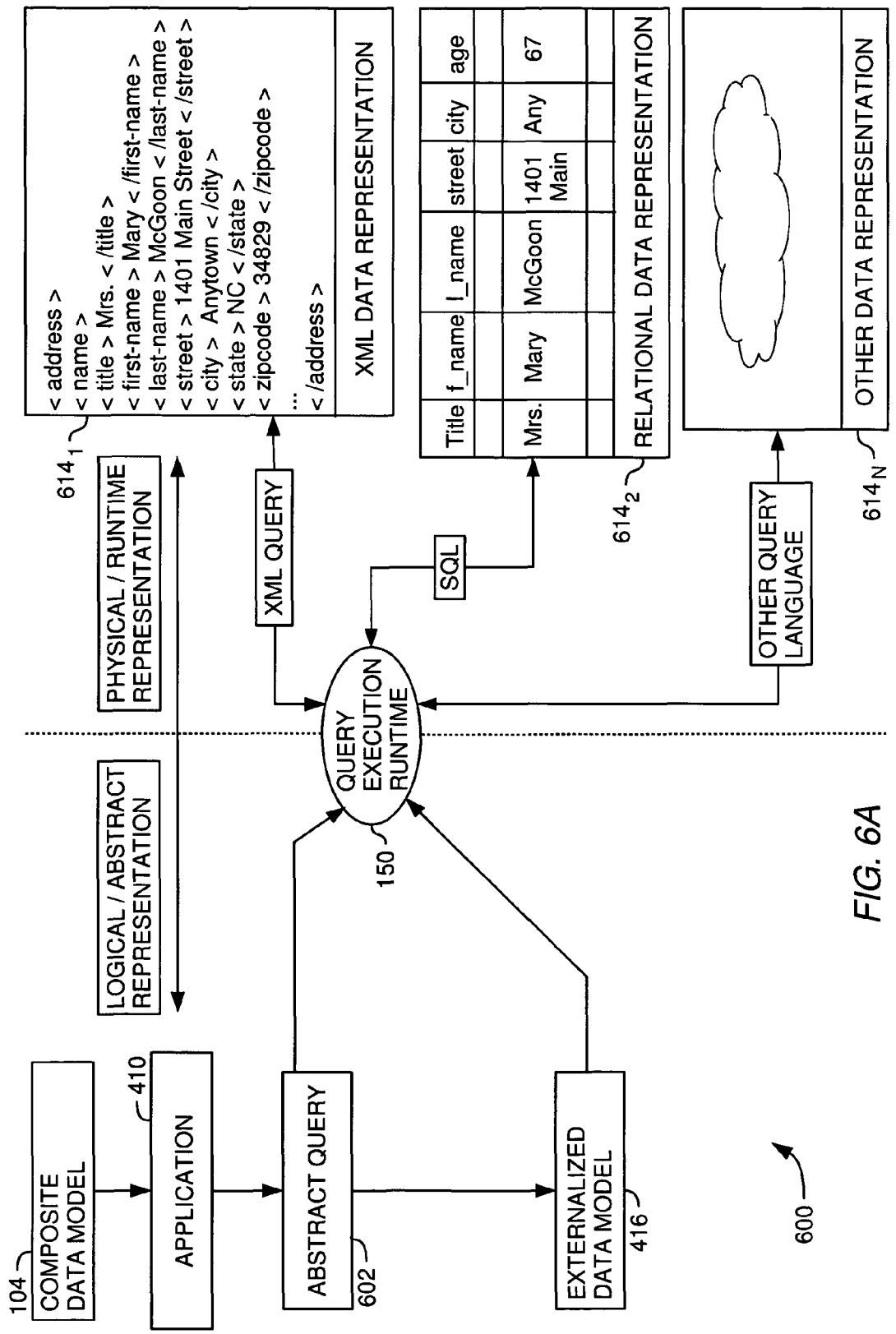
FIG. 6A is an illustrative relational view of software components.
Figure 6B:
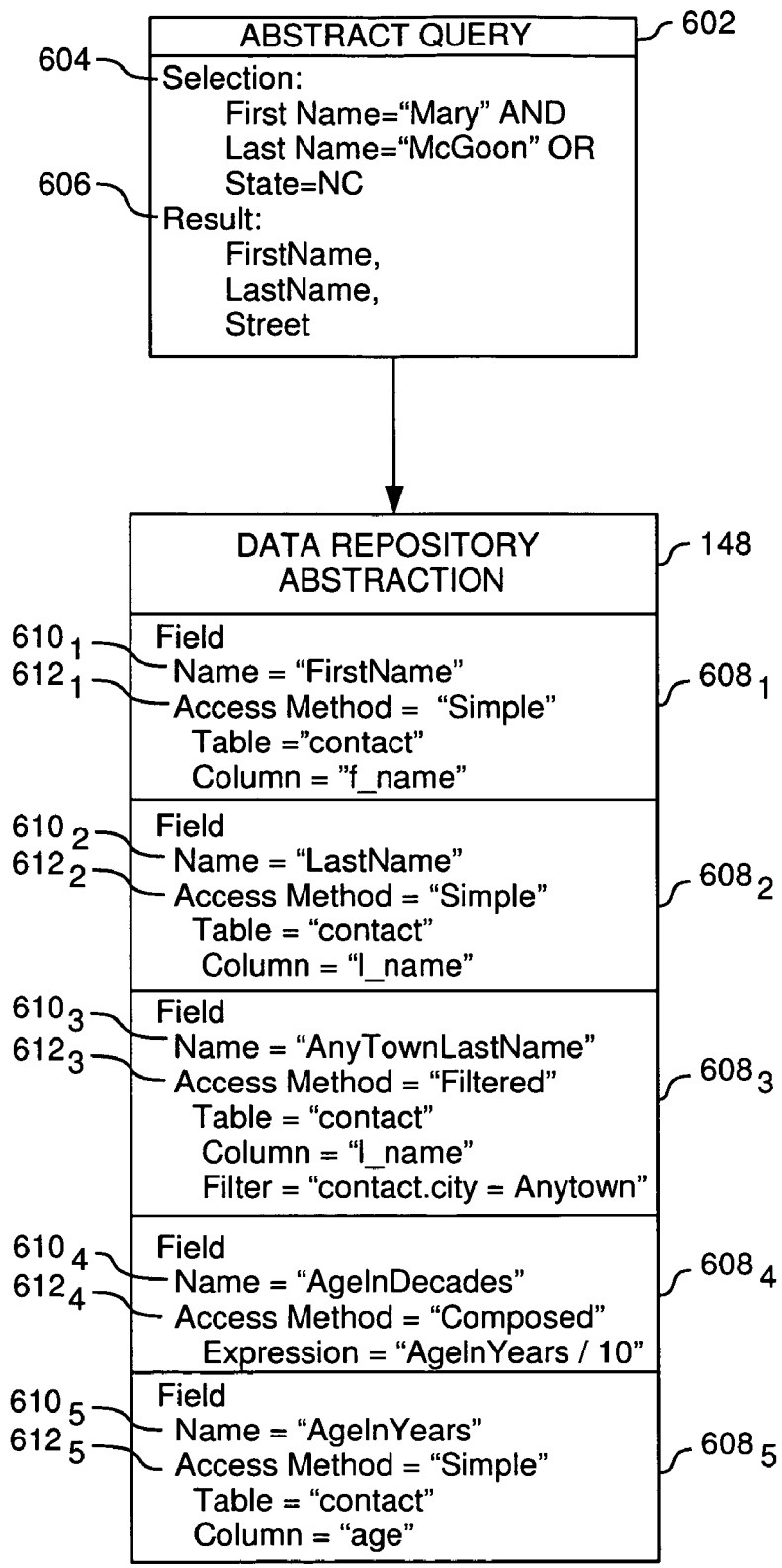
FIG. 6B is one embodiment of an abstract query and a data repository abstraction for a relational data access.

FIGS. 6A-B shows several interrelated components of an abstract data model. The requesting entity (e.g., one of the applications 410) composes and issues an abstract query 602 according to the composite data model 104 of the requesting entity. The resulting query 602 is generally referred to herein as an "abstract query" because the query is composed according to abstract (i.e., logical) fields rather than by direct reference to the underlying physical data entities in the federated database 108. As a result, abstract queries may be defined that are independent of the particular underlying data representation used. In one embodiment, the application 410 may be used to compose a query that includes criteria used for both data selection (selection criteria 604 of FIG. 6B) and an explicit specification of the fields to be returned (return data specification 606 of FIG. 6B) based on the selection criteria 604.

The logical fields specified by composite data model 104 are used to compose the abstract query 602 and are defined by a data repository abstraction component 648. In general, the data repository abstraction component 648 exposes information as a set of logical fields that may be used within a query (e.g., the abstract query 602) issued by the application 410 to specify criteria for data selection and specify the form of result data returned from a query operation. The logical fields are defined independently of the underlying data representation and locations being used by the databases 504, thereby allowing queries to be formed that are loosely coupled to the underlying data representation. Thus, some logical fields in a composite data model may refer to data stored in the local databases 106 and other logical fields may refer to data stored in the remote databases 504.

In general, the data repository abstraction component 648 comprises a plurality of field specifications $608_1$, $608_2$, $608_3$, $608_4$ and $608_5$ (five shown by way of example), collectively referred to as the field specifications 608. Specifically, a field specification is provided for each logical field available for composition of an abstract query. Each field specification comprises a logical field name $610_1$, $610_2$, $610_3$, $610_4$, $610_5$ (collectively, field name 610) and an associated access method $612_1$, $614_2$, $612_3$, $612_4$, $612_5$ (collectively, access method 612). The access methods associate (i.e., map) the logical field names to a particular physical data representation $614_1$, $614_2$ ... $614_N$ in a database (e.g., one of the databases 504). By way of illustration, two data representations are shown, an XML data representation $614_1$ and a relational data representation $214_2$. However, the physical data representation $614_N$ indicates that any other data representation, known or unknown, is contemplated. In one embodiment, the externalized data model includes fee schedules for individual logical fields or for categories of logical fields. The fee schedules may be structured, for example, according to the operation to be performed (e.g., query, insert, update, delete) or on a per item basis, or on a per request basis.

Any number of access methods are contemplated depending upon the number of different types of logical fields to be supported. In one embodiment, access methods for simple fields, filtered fields and composed fields are provided. The field specifications $608_1$, $608_2$ and $608_5$ exemplify simple field access methods $612_1$, $612_2$, and $612_5$, respectively. Simple fields are mapped directly to a particular entity in the underlying physical data representation (e.g., a field mapped to a given database table and column). By way of illustration, the simple field access method $612_1$ shown in FIG. 6B maps the logical field name $610_1$ ("FirstName") to a column named "f_name" in a table named "contact". The field specification $608_3$ exemplifies a filtered field access method $612_3$. Filtered fields identify an associated physical entity and provide rules used to define a particular subset of items within the physical data representation. An example is provided in FIG. 6B in which the filtered field access method $612_3$ maps the logical field name $610_3$ ("AnytownLastName") to a physical entity in a column named "l_name" in a table named "contact" and defines a filter for individuals in the city of Anytown. Another example of a filtered field is a New York ZIP code field that maps to the physical representation of ZIP codes and restricts the data only to those ZIP codes defined for the state of New York. The field specification $608_4$ exemplifies a composed field access method $612_4$. Composed access methods compute a logical field from physical fields using an expression supplied as part of the access method definition. In this way, information which does not exist in the underlying data representation may be computed. In the example illustrated in FIG. 6B the composed field access method $612_3$ maps the logical field name $610_3$ "AgeInDecades" to "AgeInYears/10". Another example is a sales tax field that is composed by multiplying a sales price field by a sales tax rate.

It is contemplated that the formats for any given data type (e.g., dates, decimal numbers, etc.) of the underlying data may vary. Accordingly, in one embodiment, the field specifications 608 include a type attribute which reflects the format of the underlying data. However, in another embodiment, the data format of the field specifications 608 is different from the associated underlying physical data, in which case an access method is responsible for returning data in the proper format assumed by the requesting entity. Thus, the access method must know what format of data is assumed (i.e., according to the logical field) as well as the actual format of the underlying physical data. The access method can then convert the underlying physical data into the format of the logical field.

By way of example, the field specifications 608 of the data repository abstraction component 648 shown in FIGS. 6A-B are representative of logical fields mapped to data represented in the relational data representation $614_2$. However, other instances of the data repository abstraction component 648 map logical fields to other physical data representations, such as XML. In addition, in one embodiment, the field specifications 608 may include a fee schedule that indicates how charges will be calculated for processing a query that includes that particular logical field.

An illustrative abstract query corresponding to the abstract query 602 shown in FIG. 6 is shown in Table I below. By way of illustration, the data repository abstraction 648 is defined using XML. Other languages, however, may be used to advantage.

TABLE I

QUERY EXAMPLE

```
001  <?xml version="1.0"?>
002  <!--Query string representation: (FirstName = "Mary" AND
003  LastName = "McGoon") OR State = "NC"-->
004  <QueryAbstraction>
005    <Selection>
006      <Condition internalID="4">
007        <Condition field="FirstName" operator="EQ" value="Mary"
008  internalID="1"/>
009        <Condition field="LastName" operator="EQ" value=
010  "McGoon" internalID="3" relOperator="AND"></Condition>
011      </Condition>
012      <Condition field="State" operator="EQ" value="NC"
013  internalID="2" relOperator="OR"></Condition>
014    </Selection>
015    <Results>
016      <Field name="FirstName"/>
017      <Field name="LastName"/>
018      <Field name="State"/>
019    </Results>
020  </QueryAbstraction>
```

Illustratively, the abstract query shown in Table I includes a selection specification lines 005-014) containing selection criteria and a results specification (lines 015-019). In one embodiment, a selection criterion consists of a field name (for a logical field), a comparison operator (=, >, <, etc) and a value expression (what is the field being compared to). In one embodiment, result specification is a list of abstract fields that are to be returned as a result of query execution. A result specification in the abstract query may consist of a field name and sort criteria.

An illustrative instance of a data repository abstraction component 648 corresponding to the abstract query in Table I is shown in Table II below. By way of illustration, the data repository abstraction component 648 is defined using XML. However, any other language may be used to advantage.

Figure 7:
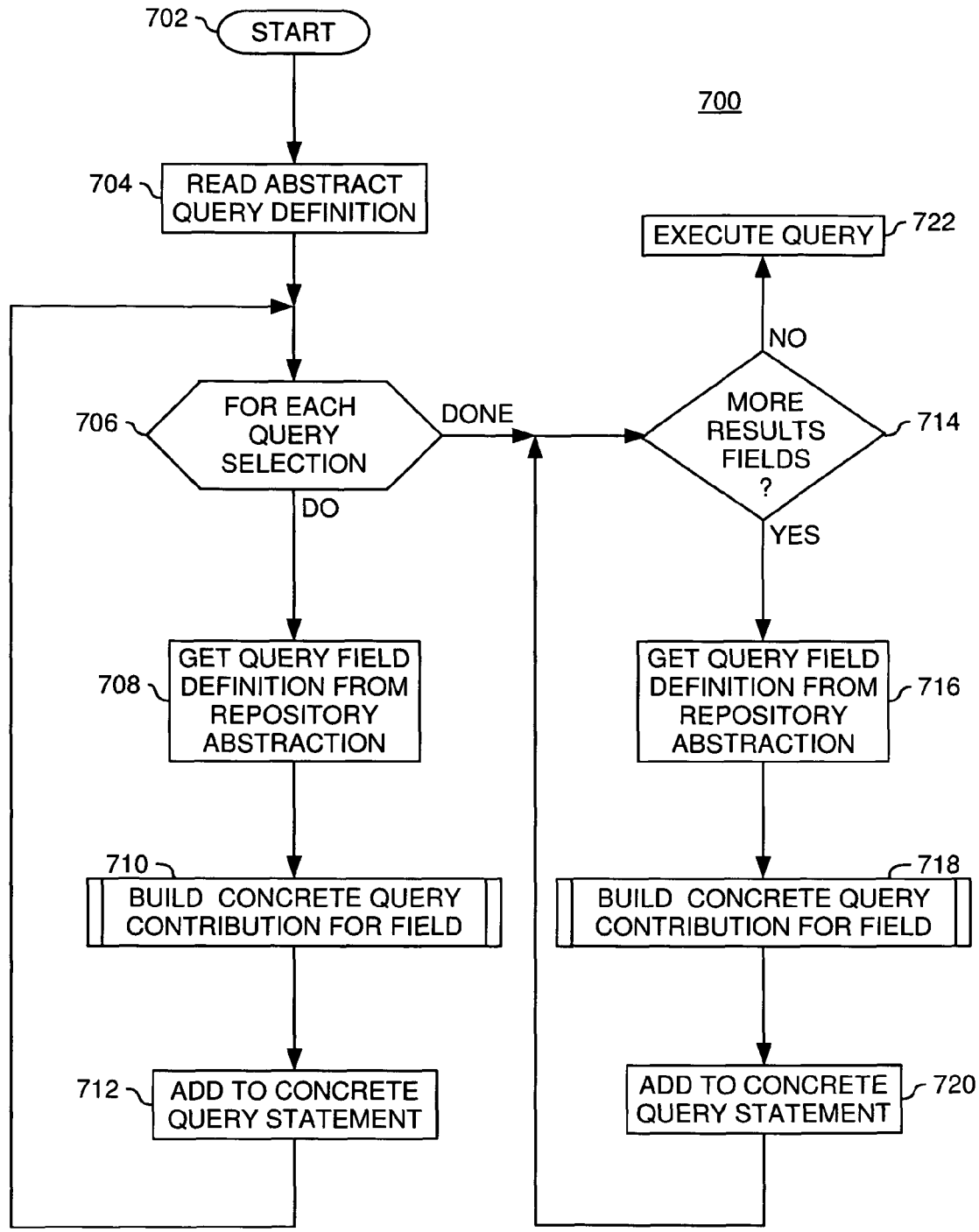
FIG. 7 is a flow chart illustrating the operation of a runtime component.

FIG. 7 shows an illustrative runtime method 700 exemplifying one embodiment of the operation of the runtime component 150. The method 700 is entered at step 702 when the runtime component 150 receives as input an instance of an abstract query (such as the abstract query 602 shown in FIG. 6). At step 704, the runtime component 150 reads and parses the instance of the abstract query and locates individual selection criteria and desired result fields. At step 706, the runtime component 150 enters a loop (comprising steps 706, 708, 710 and 712) for processing each query selection criteria statement present in the abstract query, thereby building a data selection portion of a query contribution. In one embodiment, a selection criterion consists of a field name (for a logical field), a comparison operator (=, >, <, etc) and a value expression (what is the field being compared to). At step 708, the runtime component 150 uses the field name from a selection criterion of the abstract query to look up the definition of the field in the data repository abstraction 648. As noted above, the field definition includes a definition of the access method used to access the physical data associated with the field. The runtime component 150 then builds (step 710) a concrete query contribution for the logical field being processed. As defined herein, a concrete query contribution is a portion of a concrete query that is used to perform data selection based on the current logical field. A concrete query is a query represented in languages like SQL and XML Query and is consistent with the data of a given physical data repository (e.g., a relational database or XML repository). Accordingly, the concrete query is used to locate and retrieve data from a physical data repository, represented by the databases 504 showed in FIG. 5. The concrete query contribution generated for the current field is then added to a concrete query statement. The method 700 then returns to step 706 to begin processing for the next field of the abstract query. Accordingly, the process entered at step 706 is iterated for each data selection field in the abstract query, thereby contributing additional content to the eventual query to be performed.

After building the data selection portion of the concrete query, the runtime component 150 identifies the information to be returned as a result of query execution. As described above, in one embodiment, the abstract query defines a list of abstract fields that are to be returned as a result of query execution, referred to herein as a result specification. A result

TABLE II

DATA REPOSITORY ABSTRACTION EXAMPLE

```
001  <?xml version="1.0"?>
002  <DataRepository>
003    <Category name="Demographic">
004      <Field queryable="Yes" name="FirstName" displayable="Yes">
005        <AccessMethod>
006          <Simple columnName="f_name" tableName="contact"></Simple>
007        </AccessMethod>
008        <Type baseType="char"></Type>
009      </Field>
010      <Field queryable="Yes" name="LastName" displayable="Yes">
011        <AccessMethod>
012          <Simple column Name="l_name" tableName="contact"></Simple>
013        </AccessMethod>
014        <Type baseType="char"></Type>
015      </Field>
016      <Field queryable="Yes" name="State" displayable="Yes">
017        <AccessMethod>
018          <Simple columnName="state" tableName="contact"></Simple>
019        </AccessMethod>
020        <Type baseType="char"></Type>
021      </Field>
022    </Category>
023  </DataRepository>
``` specification in the abstract query may consist of a field name and sort criteria. Accordingly, the method 700 enters a loop at step 714 (defined by steps 714, 716, 718 and 720) to add result field definitions to the concrete query being generated. At step 716, the runtime component 150 looks up a result field name (from the result specification of the abstract query) in the data repository abstraction 648 and then retrieves a result field definition from the data repository abstraction 648 to identify the physical location of data to be returned for the current logical result field. The runtime component 150 then builds (as step 718) a concrete query contribution (of the concrete query that identifies physical location of data to be returned) for the logical result field. At step 720, concrete query contribution is then added to the concrete query statement. Once each of the result specifications in the abstract query has been processed, the query is executed at step 722.

Figure 8:
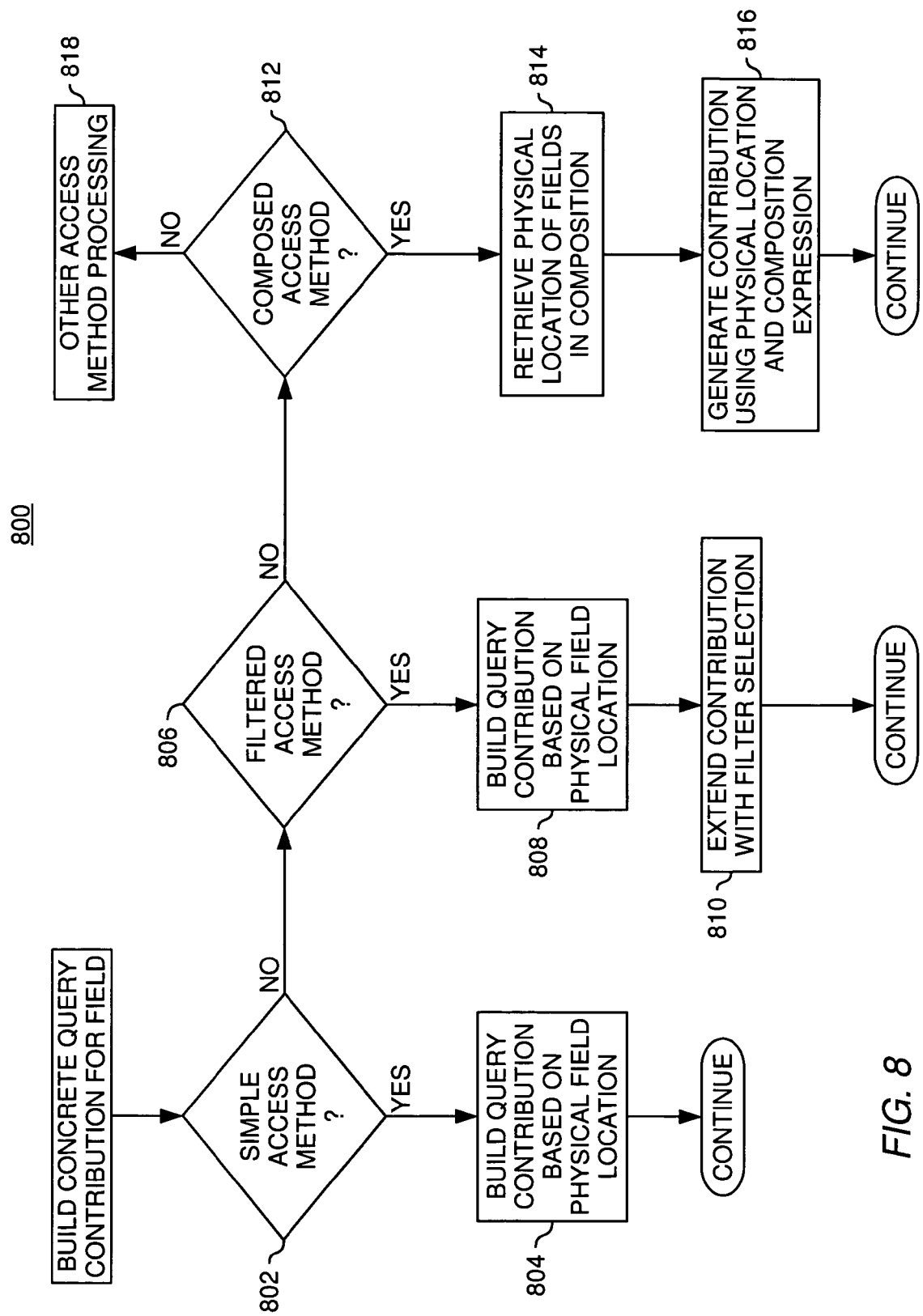
FIG. 8 is a flow chart illustrating the operation of a runtime component.

One embodiment of a method 800 for building a concrete query contribution for a logical field according to steps 710 and 718 is described with reference to FIG. 8. At step 802, the method 800 queries whether the access method associated with the current logical field is a simple access method. If so, the concrete query contribution is built (step 804) based on physical data location information and processing then continues according to method 700 described above. Otherwise, processing continues to step 806 to query whether the access method associated with the current logical field is a filtered access method. If so, the concrete query contribution is built (step 808) based on physical data location information for some physical data entity. At step 810, the concrete query contribution is extended with additional logic (filter selection) used to subset data associated with the physical data entity. Processing then continues according to method 300 described above.

If the access method is not a filtered access method, processing proceeds from step 806 to step 812 where the method 800 queries whether the access method is a composed access method. If the access method is a composed access method, the physical data location for each sub-field reference in the composed field expression is located and retrieved at step 814. At step 816, the physical field location information of the composed field expression is substituted for the logical field references of the composed field expression, whereby the Concrete Query Contribution is generated. Processing then continues according to method 700 described above.

If the access method is not a composed access method, processing proceeds from step 812 to step 818. Step 818 is representative of any other access methods types contemplated as embodiments of the present invention. However, it should be understood that embodiments are contemplated in which less then all the available access methods are implemented. For example, in a particular embodiment only simple access methods are used. In another embodiment, only simple access methods and filtered access methods are used.

As described above, it may be necessary to perform a data conversion if a logical field specifies a data format different from the underlying physical data. In one embodiment, an initial conversion is performed for each respective access method when building a concrete query contribution for a logical field according to the method 800. For example, the conversion may be performed as part of, or immediately following, the steps 804, 808 and 816. A subsequent conversion from the format of the physical data to the format of the logical field is performed after the query is executed at step 722. Of course, if the format of the logical field definition is the same as the underlying physical data, no conversion is necessary.

Other Embodiments of Data Repository Abstraction Components

In one embodiment, a different single data repository abstraction component 648 is provided for each separate physical data representation 614 (as in FIGS. 6A and 2B). In an alternative embodiment, a single data repository abstraction component 648 contains field specifications (with associated access methods) for two or more physical data representations 504. In yet another embodiment, multiple data repository abstraction components 648 are provided, where each data repository abstraction component 648 exposes different portions of the same underlying physical data (which may comprise one or more physical data representations 504). In this manner, a single application 410 may be used simultaneously by multiple users to access the same underlying data where the particular portions of the underlying data exposed to the application are determined by the respective data repository abstraction component 648. This latter embodiment is described in more detail in United States patent Application No. 1009/132,228, entitled "Dynamic End User Specific Customization Of An Application's Physical Data Layer Through A Data Repository Abstraction Layer" and assigned to International Business Machines, Inc., which is hereby incorporated by reference in its entirety.

In any case, a data repository abstraction component 648 contains (or refers to) at least one access method which maps a logical field to physical data. To this end, as illustrated in the foregoing embodiments, the access methods describe a means to locate and manipulate the physical representation of data that corresponds to a logical field.

In one embodiment, the composite data model may 648 is extended to include a description of a multiplicity of data repositories 504 that are both local and distributed across a network environment. The data repositories 504 may use a multitude of different data representations and data access techniques (e.g., the physical data repositories $302_{1-4}$ illustrated in FIG. 3). In one embodiment, this is accomplished by configuring the access methods of the data repository abstraction component 648 with a location specification defining a location of the data associated with the logical field, in addition to the method used to access the data. For example, a composite data model 104 may provide a data repository abstraction component 648 that references externalized data models 502 corresponding to a remote data site 408. Thus, a particular logical field 602 included in a composite data model 104 may be the same logical field appearing in the externalized data model. Alternatively, a particular logical field 602 in the composite data model 104 may use an access method that maps to the logical field of the externalized data model 508, which in turn maps to the underlying physical data source 504.

Figure 9:
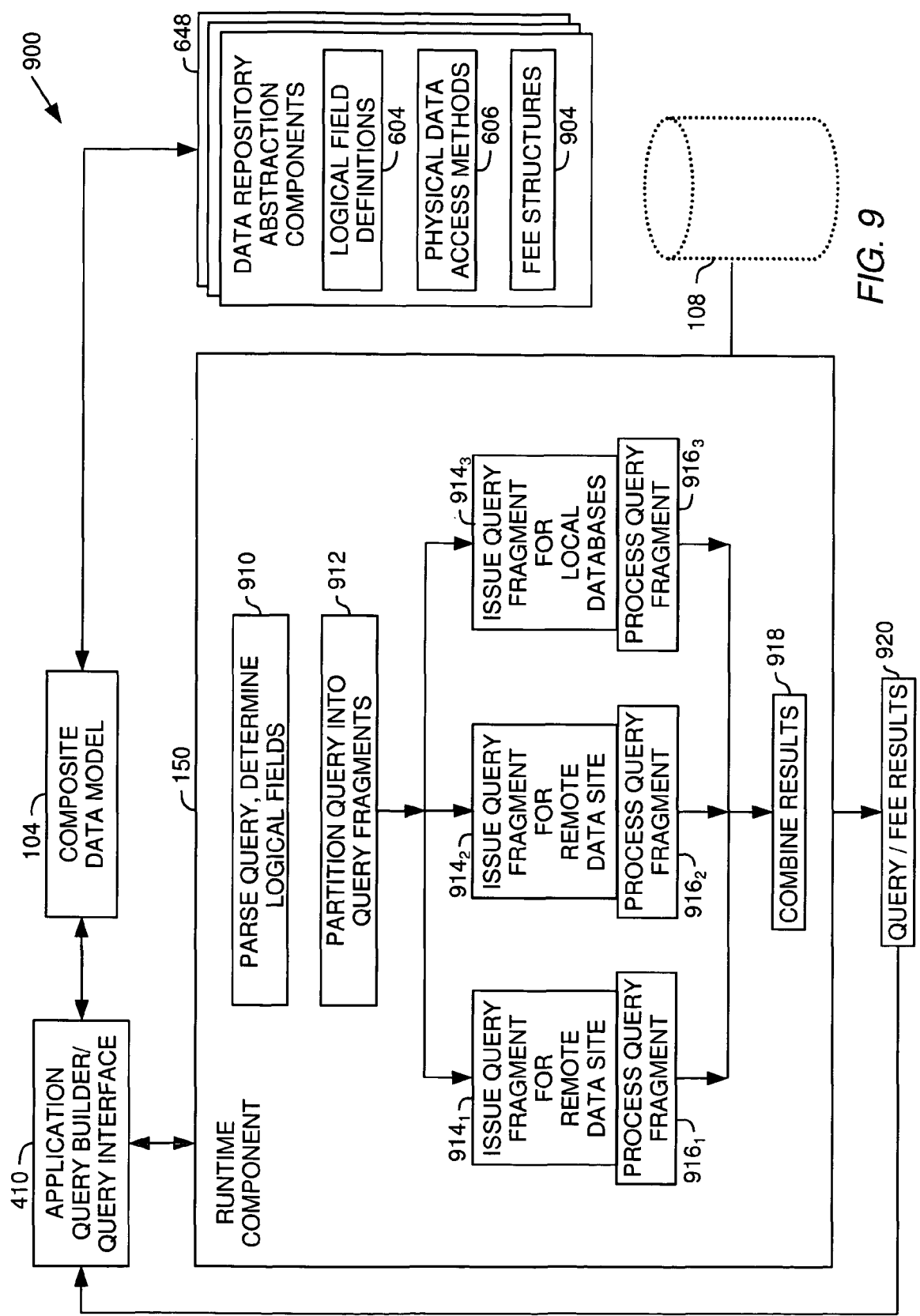
FIG. 9 is an illustrative relational view of software components in which multiple sources of data are accessible.

Referring now to FIG. 9, a logical/runtime view of an environment 900 having a federated database 108 is shown and illustrates one embodiment of the operation of a runtime component 150. The database components used to construct the federated database 108 may be local, remote or a combination of both. In one embodiment, the database components are collectively representative of the database components 504 illustrated in FIG. 5. Thus, each externalized data model 502 may include a data repository abstraction component 648 that provide access methods that map a set of externalized logical fields to the underlying physical data.

In general, the data repository abstraction component 648 included in an externalized data model is similarly configured as the embodiments described above. As such, data repository abstraction components 648 have logical field definitions and an associated access method for each logical field definition. However, in contrast to other embodiments in which only a single data source is accessed, the access methods in the externalized data model are configured with location specifications in addition to physical representation specifications. The location specifications describe the location (i.e., the data source) in which the data to be accessed (i.e., the data associated with the logical field definitions) is located. However, in one embodiment, it is contemplated that some access methods may be configured without location specifications, indicating a default to a local data source. For example, logical fields in the composite data model with access methods that map to the local databases (e.g. $106_1$) may omit a location specification.

FIG. 9 illustrates the query application 410, the composite data model 104, data repository abstraction components 648 (used to map logical fields to access methods) and the runtime component 150 responsible for converting an abstract query into one or more data access requests that query physical data repositories 504 encapsulated by the federated database 108. The data repository abstraction component 648 and runtime component 150 of FIG. 9 are configured to support the definition and query of logical fields having associated data that may be distributed across multiple local and/or remote physical data repositories 504 and which may be accessed via multiple interfaces.

To this end, the application 410 defines its data requirements in terms of the composite data model 104 which contains query selection and/or update logic based on logical fields, not the physical location or representation of the actual data involved. The data repository abstraction component 648 comprises logical field definitions 604 and an access method 606 for each logical field. The composite data model 104 may comprise a collection of logical fields from multiple externalized data models, and each logical field from an externalized data model may specify a fee schedule 904. Alternatively, an externalized data model may define a fee schedule independently from the logical fields. Or for data models not implementing abstraction techniques disclosed herein, may define fee schedules according to the data model employed (e.g., a fee structure of per row charges for results returned from an SQL table). The logical field definitions 604 describe the logical fields available for use by the application 410. In one aspect, the composite data model 104 governs the information available for use by the application 410. New logical fields, presented in a new local or remote data source, may be made available for use by applications 410 in composing queries. Each of the access methods 606 defines the mapping between a logical field and its physical representation in a local/remote data source included in federated database 108.

FIG. 9 further illustrates one embodiment of the operation of the runtime component 150. In general, the runtime component 150 is responsible for processing an abstract query. To this end, at step 910, the runtime component 150 parses the abstract query to identify the logical fields appearing in the abstract query. In one embodiment, the runtime component 150 partitions (step 912) the overall query into one or more query fragments (step 914) representing access to the same physical resource using the same method of access (e.g., query fragments may be grouped according to each externalized data model used in constructing the composite data model). The query fragments are then executed (block 916). Results from each of the queries are merged (block 918) before the collective query results 920 are returned to the application 410. In addition, fee data is calculated and recorded for each query fragment that may incur fees (step 920). In one aspect, this query partitioning approach allows the runtime component 150 to run multiple query fragments in parallel, and may take advantage of multi-CPU hardware architectures.

Figure 10:
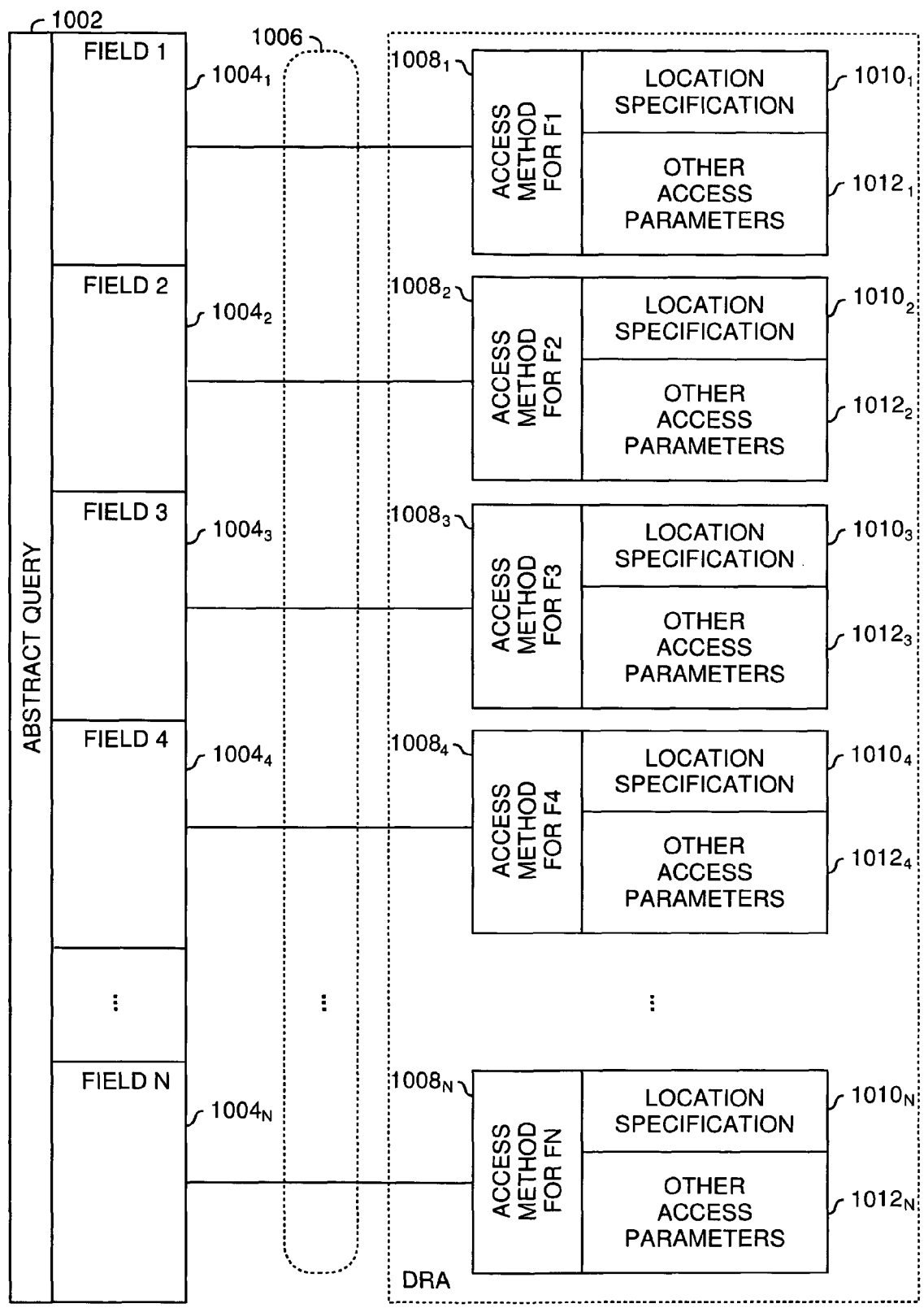
FIG. 10 shows an illustrative abstract query comprising a plurality of logical fields.

FIG. 10 further illustrates an abstract query 1002 comprising a plurality of logical fields $1004_1 \ldots 1004_N$ (collectively the logical fields 1004). Each of the logical fields 1004 are related (represented by lines 1006) to an access method $1008_1 \ldots 1008_N$ (collectively the access methods 1008) by the definition of the particular data repository abstraction component 648. Physical representation information in the access methods 1008 includes the name of the access method to be used (here represented as "access method for F1", "access method for F2", etc.) and a plurality of parameters to be passed to the named access method and which describe how to access the physical data associated with the logical field. In general, such parameters include a locator parameter $1010_1 \ldots 1010_N$ (collectively the locator parameters 1010; also referred to herein as a location specification) and other access parameters needed to access the data. A given data repository abstraction component 648. For example, the access parameters 1012 may identify the user corresponding to the access method or may identify the fee schedule associated with the particular logical field.

Figure 11:
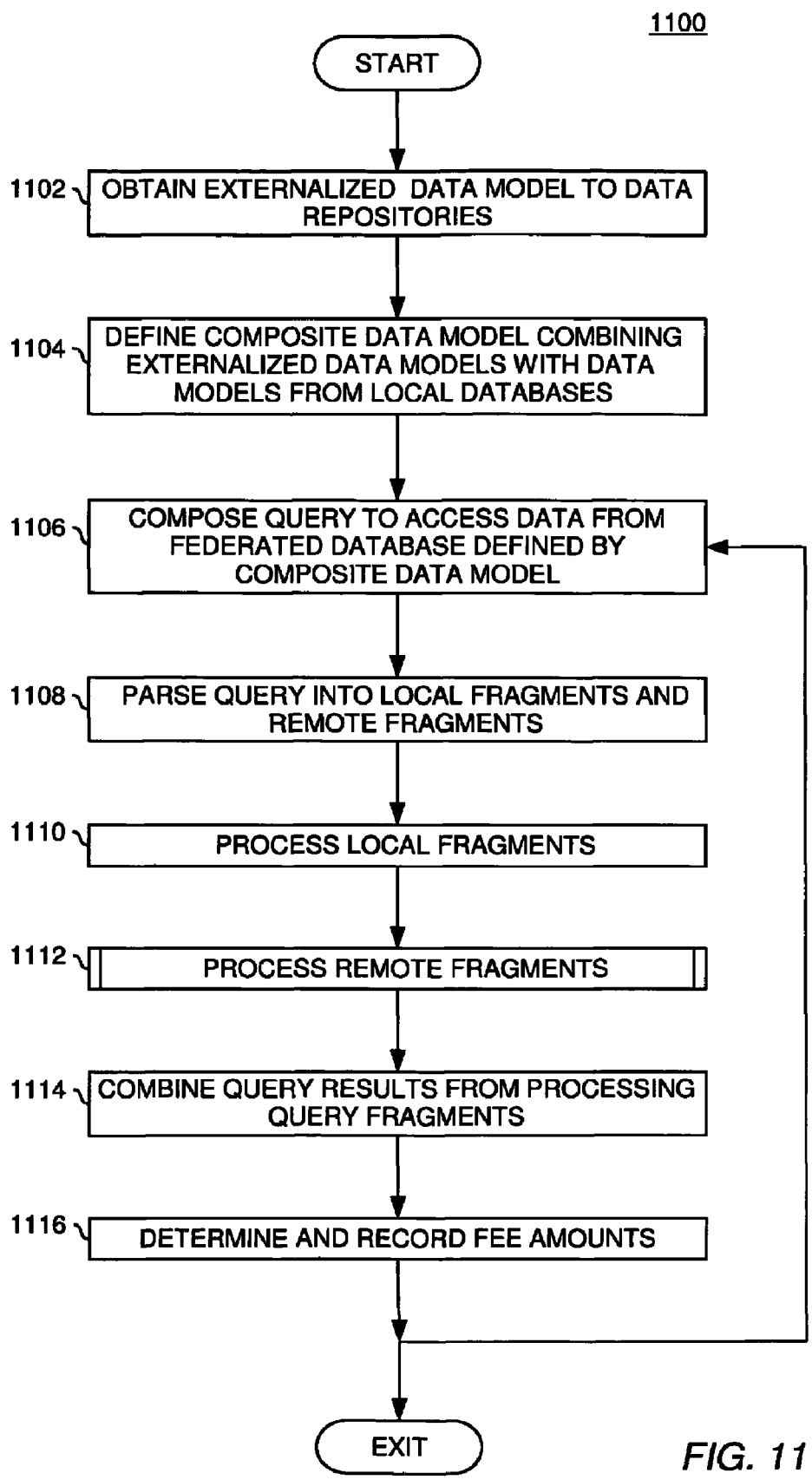
FIG. 11 illustrates a method for processing data access requests and determining a corresponding fee, according to one embodiment of the invention.

FIG. 11 illustrates operations 1100 for processing queries issued against a federated database 108 that includes fees for accessing data from some of the underlying database components included in the federated database 108, according to one embodiment of the invention. Operations 1100 begin at step 1102 after an entity that controls a set of databases externalizes database components in an externalized data model. In addition to the externalized to database components, the externalized data model may also include a fee schedule that indicates how charges will be assessed to other parties that access data through the externalized data model. At step 1102, a second entity obtains the externalized data model. At step 1104, the second entity defines a composite data model combining database components controlled by the second entity along with database components defined by the externalized data model.

The first two steps of operations 1100 serve to create a computing environment where users may compose queries against the composite data model (i.e. the federated database) and access and retrieve data therefrom. Accordingly, steps 1106 through 1116 may be repeated for each query executed against the federated database 108.

At step 1106, users may compose a query to access data from federated database 108. In one embodiment, a user interacting with applications 410 may define an abstract query comprising a set of logical fields, conditions, and desired results fields. Such a query may then be processed according to the operations illustrated in FIG. 9. Thus, at step 1108, a runtime component 150 may be used to parse and divide the query into a set of query fragments. The set of query fragments may include both local query fragments and remote query fragments. At step 1110, the runtime component processes the local fragments by using the access method indicated by each logical field to map to data stored in the local database components embedded in the composite data model. Note that the order of steps 1110 and 1112 may occur based on the particular query. That is, some queries may require a specific order of query fragment processing.

In step 1112, the runtime component processes the remote query fragments to retrieve data from the remote data sites.

Once all the query fragments have been processed, the runtime component may merge results into a set of result data returned to the user that composed the query. In one embodiment, the runtime component processes the remote query fragments directly. For example, if the query fragment includes logical fields that map to an externalized data model, then the runtime component may use the access method specified by the field specification for each logical field to map each one to an underlying remote data source. In such an embodiment, the remote data source must be directly visible over the network connecting the local computing environment with the remote data site. Alternatively, the runtime component 150 may provide each of the query fragment remote query fragment to a remote data site for processing. At the remote data site, a runtime component may process a remote query fragment and return any retrieved data to the runtime component running on the local site.

In any case, as remote query fragments are processed, fee amounts are calculated according to a fee schedule. In one embodiment, fee schedules are defined as part of the externalized data model. In another embodiment, fee schedules may be defined by contractual agreements between the first entity and the second entity that allows data that it controls to be accessed through the externalized data model. Accordingly, at step 1116 any fees incurred as a result of data accessed from a remote data side in response to query fragments issued against a remote data site are recorded at step 1116.

Figure 12:
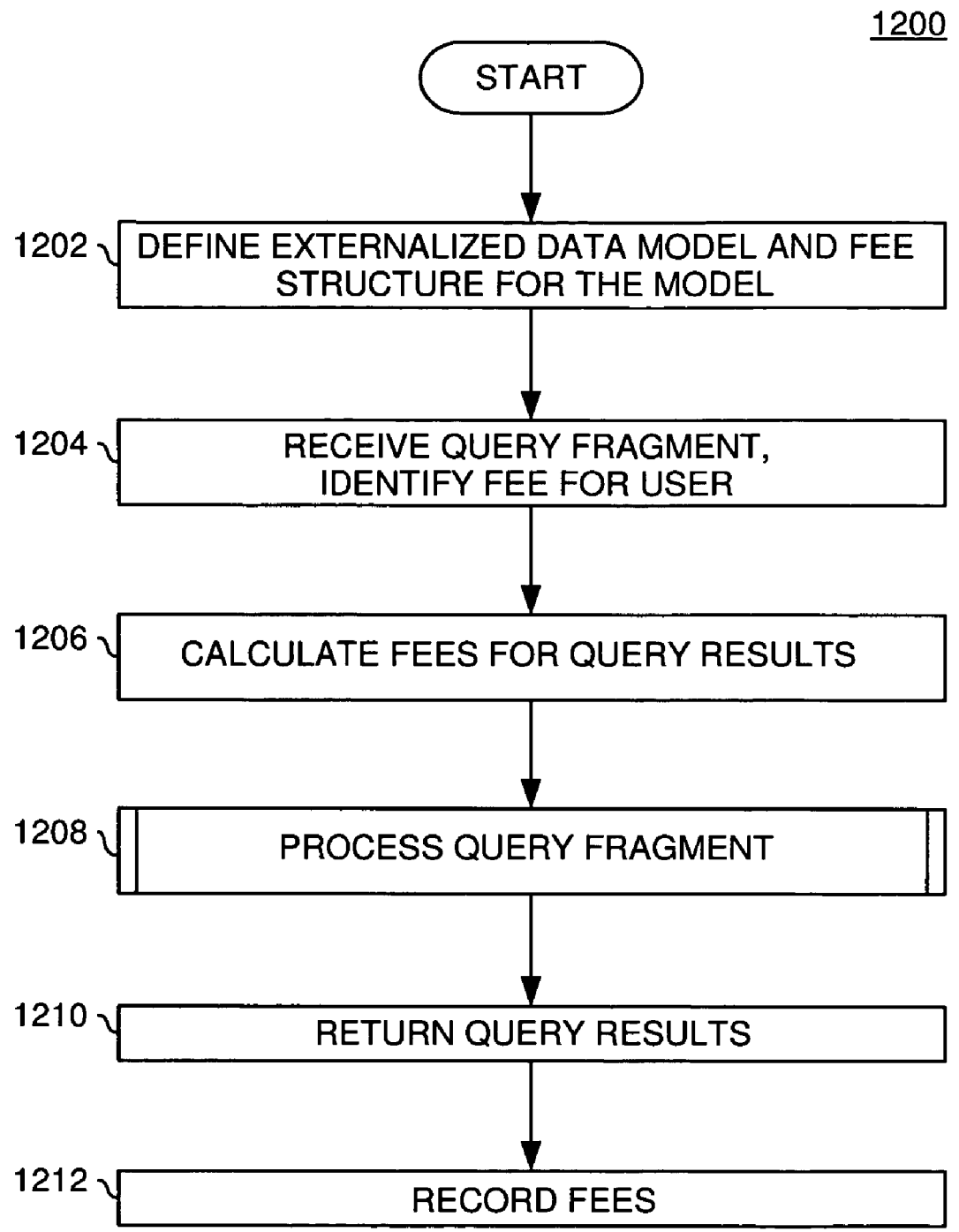
FIG. 12 illustrates a method for providing fee based access to data from a federated database, according to one embodiment of the invention.

FIG. 12 illustrates operations 1200 for a first entity that controls a set of databases to externalize some data and making it available, for fees, to other entities. The operations 1200 begin at step 1202 where the first entity defines an externalized data model and fee schedule corresponding to the data components externalized by the model. Once externalized, the first entity may receive query fragments seeking to access data. Thus, at step 1204, the first entity receives a query fragment and identifies the source of the query fragment. In one embodiment, a transaction manager may be configured to monitor the remote query fragments that are received and to determine and record fee amounts corresponding to each query fragment that is received. At step 1208, fees are calculated for results associated with the processing of the query. For some fee structures, a fee amount may be dependent on the volume of data retrieved. For such embodiments, an fee estimate may be determined, or fee calculation may be delayed until data is retrieved At step 1210, results are returned. In one embodiment, only an indication of results may be returned to the requesting entity along with an indication of a fee amount associated with the data retrieved by the query fragment. And the requesting entity may be required to approve the fee charges associated with the data access request. Next, at step 1212, fees are recorded against an account associated with the requesting entity.

Figure 13:
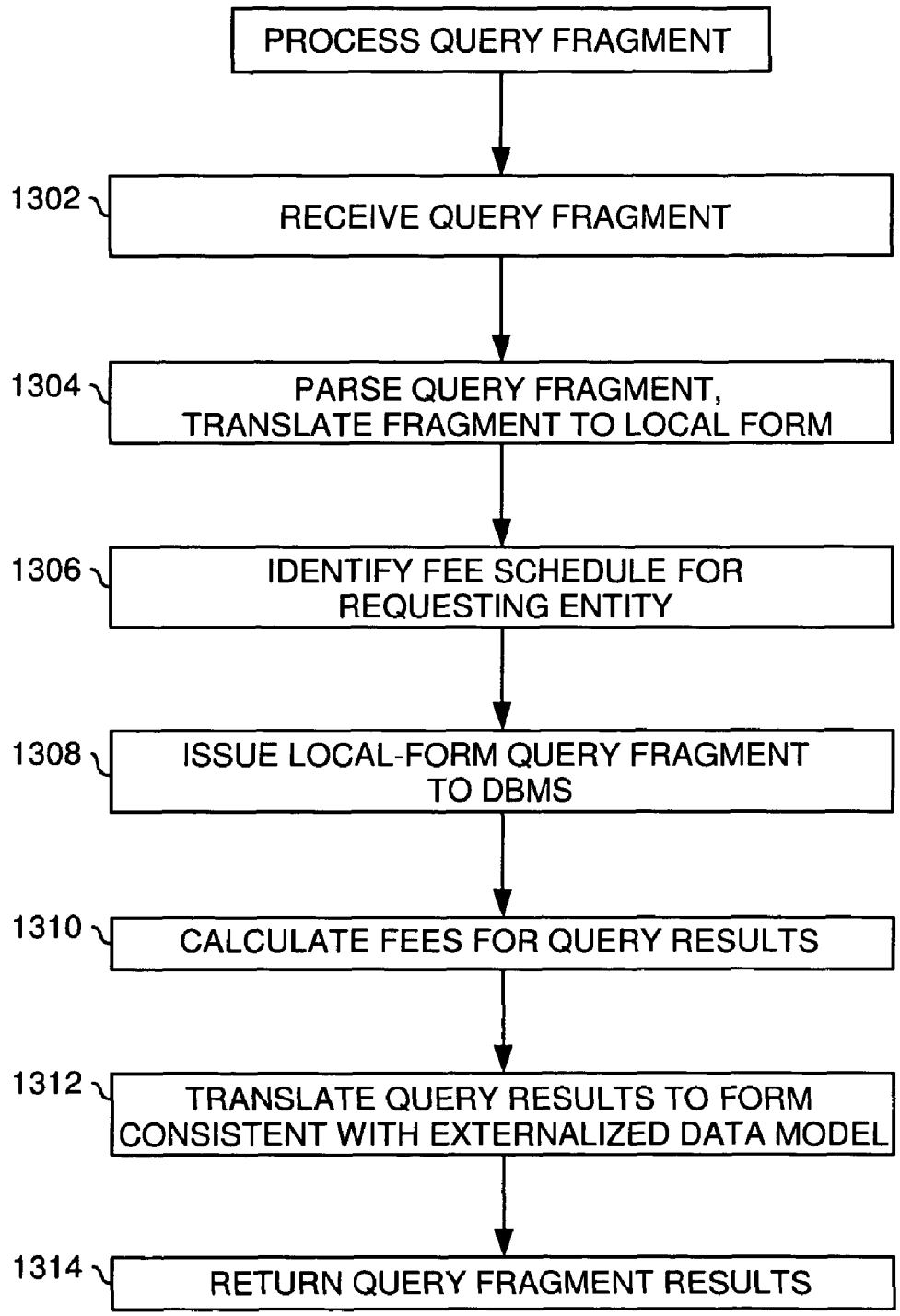
FIG. 13 illustrates a method for processing a query fragment and recording any corresponding fee charges, according to one embodiment of the invention.

FIG. 13 illustrates an embodiment of a method for processing a remote query fragment. Operations 1300 begin at step 1302 when a computing environment (e.g., the computing environment 102₁ illustrated in FIG. 1 or remote data site 408 from FIG. 4) receives a query fragment. At step 1304, the query fragment is parsed and translated to a form consistent with a physical data representation storing the data. For example, if the composite data model defines logical fields and access methods, the query fragment may be converted into a concrete query contribution used to access the underlying physical data representation. Alternatively, the composite data model might define an SQL schema to federated database 108. In this case, the rows, columns, and relations from the federated schema may be translated into the schema of the physical relational database (e.g., database 302₂ from FIG. 3).

Along with the data access request portion, at step 1306, query fragments may identify the source of the query, and a fee schedule corresponding to the source of the query. Alternatively, a transaction manager may inspect the query fragment and identify segments of the query fragment that request covered by with a fee schedule. At step 1308, the query is issued against the underlying physical repository. At step 1308, fees are calculated for the result data generated by the query. For example, as described, one fee structure includes charging for the volume of result data. Accordingly, at step 1308, this volume is measured to determine a fee for the query fragment.

At step 1312, the result data may need to be translated back into the form specified in the externalized data model (and ultimately the composite data model.) For example, if the composite data model defined federated database 108 using an SQL schema, then data retrieved from the remote query fragment may need to be mapped back into the federated database schema. Once any processing is completed during step 1312, the results for the query are returned to the requesting entity 1314 and merged into completed query results.

Embodiments of the present invention allow cooperating parties to share data and allow for parties to competitively profit for providing access to data store. In one illustrative embodiment, databases 504, may store life-sciences data. For example, the databases 504 might store data obtained from patients treated at a particular hospital or research institution. Researchers at another institution might wish to combine data obtained from a particular test across the two institutions. Researches accessing data from the combined set would incur charges only for data obtained from the first party. Researches at the second institution join test results data against other information about testing practices to improve treatment practices.

In another illustrate application, researches may wish to correlate data. For example, researches could query the federated database to retrieve all patients treated for one condition by the first hospital and for a second condition at the second hospital. If the two discrete groups specialized in unrelated fields of medial treatment, new connections between certain conditions could be revealed, or a more comprehensive view of individual treatment history could be obtained. In addition, the arrangement between the two groups could be mutual. That is, each hospital could define an externalized data model. Thereafter, the two individual institutions could access data from the other with fees being charged in both directions.

In another illustrative embodiment, data from the federated database itself may be offered as a product. For example, medical and genetic data controlled by one entity could be combined with genealogy data from another entity and offered as a combined set for access by third parties. Fees charged to third parties for accessing the combined, federated database would be accounted for on a per query basis, and fee amounts collected may be apportioned depending on the data retrieved from queries. That is, fees for medical and genomic data apportioned to the research institution while fees for genealogic data apportioned to the entity providing the genealogic data.

While the foregoing is directed to embodiments of the present invention, other and further embodiments of the invention may be devised without departing from the basic scope thereof, and the scope thereof is determined by the claims that follow.

What is claimed is:

1. A computer-implemented method for accessing data, comprising:

exposing an externalized data model, wherein the externalized data model describes a structure of data stored in one or more database systems controlled by a first entity and provides a fee schedule describing how to calculate fees for accessing data made available through the externalized data model, and wherein the externalized data model comprises a data repository abstraction component defining a set of logical fields for composing an abstract query, and for each of the logical fields, providing (i) a logical filed name and (ii) an access method which specifies at least a method for accessing the data according to a physical data representation of the one or more database systems and a location of the data;

receiving, from a second entity, a composite data model, wherein the composite data model describes a federated database composed from at least a first one of the database systems exposed in the externalized data model and at least one database system controlled by the second entity;

receiving a composite query composed according to the composite data model;

providing the composite query to a runtime component configured to execute the composite query against the federated database, wherein the runtime component is configured to:

generate at least a first database query fragment executed against at least the first of the one or more database systems controlled by the first entity, generate at least a second database query fragment executed against the database system controlled by the second entity, and merge data received from executing the first and second database query fragments as a query result for the composite query;

determining, by execution of the runtime component on one or more computer processors, a fee amount charged to the second entity for accessing at least one element of data included in the query results originating from one or more of the database systems exposed in the externalized data model provided by the first entity.

2. The method of claim 1 wherein the fee schedule describing how to calculate fees for accessing data corresponding to at least one of the logical fields made available through the externalized data model.

3. The method of claim 1, wherein the externalized data model comprises defines an SQL schema corresponding to an underlying relational data source.

4. The method of claim 1, further comprising:

providing the second entity with an indication of fee amounts for accessing data corresponding to the first query fragment; and requiring the second entity to accept the fee amounts charged by the first entity for accessing data for the first query fragment prior to returning results data to the second entity.

5. A system for providing access to data comprising:

one or more processors;

an externalized data model stored on a computer readable medium which describes a structure of data stored in one or more database systems controlled by a first entity and provides a fee schedule describing how to calculate fees for accessing data made available through the externalized data model, and wherein the externalized data model comprises a data repository abstraction component defining a set of logical fields for composing an abstract query, and for each of the logical fields, providing (i) a logical filed name and (ii) an access method which specifies at least a method for accessing the data according to a physical data representation of the one or more database systems and a location of the data;

a composite data model stored on a computer storage readable medium, wherein the composite data model describes a federated database composed from at least a first of the one or more of the database systems controlled by the first entity that are described in the externalized data model and at least one database system provided by a second entity that is described in the composite data model;

a user interface for composing a composite query to retrieve data from the federated database defined by the composite data model; and a runtime component which when executed by the one or more processors is configured to:

generate, from the composite query, at least a first database query fragment executed against the first of the one or more database systems controlled by the first entity, generate, from the composite query, at least a second database query fragment executed against the database system controlled by the second entity, and merging data received from executing the first and second database query fragments as a query result for the composite query; and determine a fee amount charged to the first entity for accessing data included in the query results originating from one or more of the database systems provided by the first entity.

6. The system of claim 5 wherein the externalized data model defines an SQL schema defining the tables, columns, keys, and relations for the externalized data.

* * * * *